(12) United States Patent
Choi et al.

(10) Patent No.: US 10,098,110 B2
(45) Date of Patent: Oct. 9, 2018

(54) METHOD AND APPARATUS FOR ALLOCATING WIRELESS RESOURCES BASED ON SINGLE RESOURCE UNIT IN WLAN

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 15/513,873

(22) PCT Filed: Oct. 5, 2015

(86) PCT No.: PCT/KR2015/010520
§ 371 (c)(1),
(2) Date: Mar. 23, 2017

(87) PCT Pub. No.: WO2016/056808
PCT Pub. Date: Apr. 14, 2016

(65) Prior Publication Data
US 2017/0295566 A1    Oct. 12, 2017

Related U.S. Application Data

(60) Provisional application No. 62/059,982, filed on Oct. 5, 2014.

(51) Int. Cl.
*H04W 72/04* (2009.01)
*H04W 72/12* (2009.01)

(52) U.S. Cl.
CPC ..... *H04W 72/044* (2013.01); *H04W 72/0473* (2013.01); *H04W 72/04* (2013.01); *H04W 72/0493* (2013.01); *H04W 72/1252* (2013.01)

(58) Field of Classification Search
CPC ............... H04W 72/04; H04W 72/044; H04W 72/0473; H04W 72/0493; H04W 72/1252
(Continued)

(56) References Cited

U.S. PATENT DOCUMENTS 9,775,147 B2 *  9/2017  Kenney ............... H04W 72/044
9,844,028 B2 * 12/2017  Yang ..................... H04W 72/02
(Continued)

FOREIGN PATENT DOCUMENTS

WO    WO 2013/073921 A1    5/2013

OTHER PUBLICATIONS

Jinsoo Choi et al., "Discussion on OFDMA in HEW", IEEE 11-13/1382r0, Nov. 12, 2013, (https://mentor.ieee.org/802.11/documents?is_den=1382), See pp. 4-8.

*Primary Examiner* — Stephen J Clawson
(74) *Attorney, Agent, or Firm* — Birch, Stewart, Kolasch & Birch, LLP

(57) ABSTRACT

Disclosed are a method and an apparatus for allocating wireless resources based on a single resource unit in a WLAN. The method for allocating the wireless resources based on a single resource unit in a WLAN may comprise the steps of: an AP scheduling, on a bandwidth, a plurality of wireless resources for communication with a plurality of STAs; and the AP transmitting a plurality of items of downlink data to each of the plurality of STAs through each of the plurality of wireless resources, wherein when resource allocation based on a virtual allocation resource unit is not supported, each of the plurality of wireless resources can include at least one first resource unit only or at least one second resource unit only, wherein the size of the first resource unit can be larger than the size of the second resource unit.

10 Claims, 10 Drawing Sheets

(58) Field of Classification Search
USPC .......................................................... 370/431
See application file for complete search history.

(56) References Cited

U.S. PATENT DOCUMENTS

| | | | |
|---|---|---|---|
| 2008/0025267 A1* | 1/2008 | Wei .................. | H04L 1/0025 370/337 |
| 2009/0245193 A1* | 10/2009 | Gaal .................. | H04L 5/023 370/329 |
| 2011/0116401 A1* | 5/2011 | Banerjea ............ | H04W 74/0816 370/252 |
| 2011/0255620 A1* | 10/2011 | Jones, IV ........... | H04L 5/0046 375/260 |
| 2012/0052900 A1* | 3/2012 | Liu .................... | H04W 28/0205 455/515 |
| 2012/0213204 A1* | 8/2012 | Noh .................. | H04W 72/02 370/331 |
| 2013/0170449 A1* | 7/2013 | Chen .................. | H04L 1/0038 370/329 |
| 2013/0188565 A1* | 7/2013 | Wang ................. | H04W 72/121 370/329 |
| 2014/0169356 A1 | 6/2014 | Noh et al. | |
| 2015/0139091 A1* | 5/2015 | Azizi ................. | H04L 5/003 370/329 |
| 2016/0050666 A1* | 2/2016 | Yang .................. | H04W 72/02 370/329 |
| 2016/0142187 A1* | 5/2016 | Yang .................. | H04L 27/2602 370/328 |
| 2016/0143010 A1* | 5/2016 | Kenney ............... | H04W 4/008 370/330 |
| 2017/0273083 A1* | 9/2017 | Chen .................. | H04L 1/0071 |
| 2018/0007179 A1* | 1/2018 | Chen .................. | H04L 69/324 |

* cited by examiner

FIG. 1
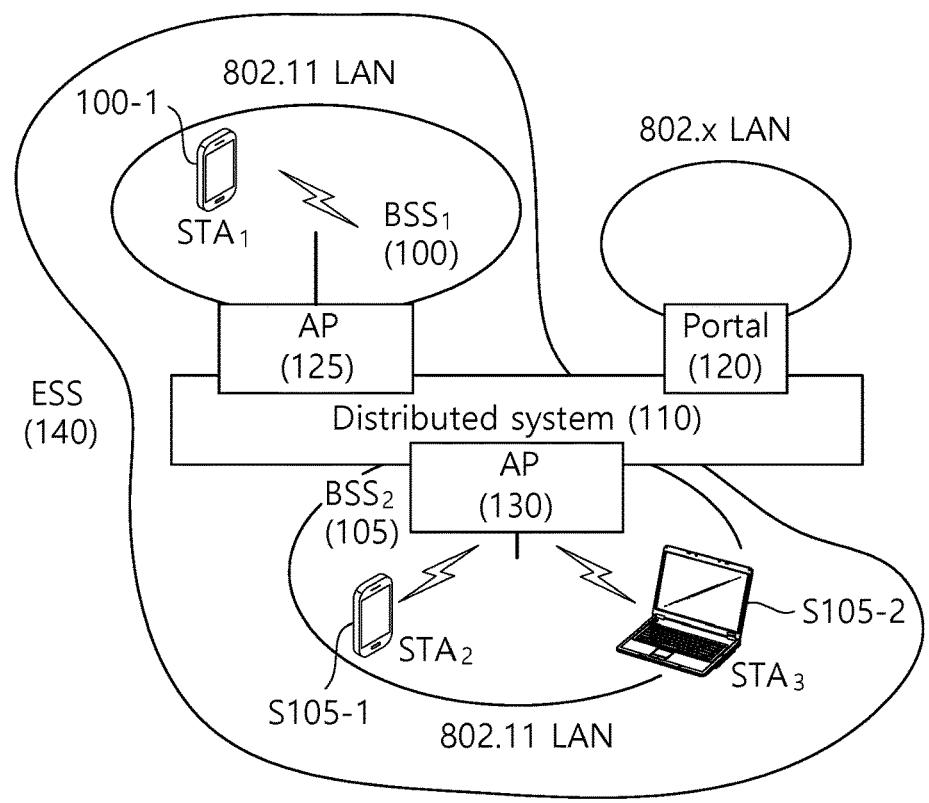
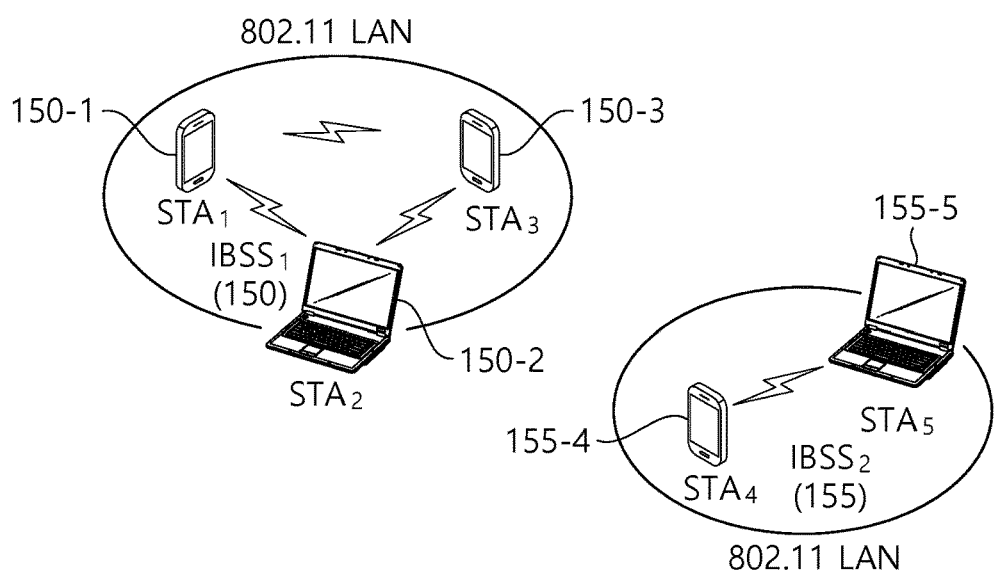

METHOD AND APPARATUS FOR ALLOCATING WIRELESS RESOURCES BASED ON SINGLE RESOURCE UNIT IN WLAN

CROSS REFERENCE TO RELATED APPLICATIONS

This application is the National Phase of PCT International Application No. PCT/KR2015/010520, filed on Oct. 5, 2015, which claims priority under 35 U.S.C. 119(e) to U.S. Provisional Application No. 62/059,982, filed on Oct. 5, 2014, all of which are hereby expressly incorporated by reference into the present application.

BACKGROUND OF THE INVENTION

Field of the Invention

The present invention relates to wireless communication, and more particularly, to a method and apparatus for allocating wireless resources based on a single resource unit in a WLAN (wireless local area network).

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present invention provides a method of allocating wireless resources based on a single resource unit in a WLAN.

The present invention also provides a wireless communication apparatus for performing a method of allocating wireless resources based on a single resource unit in a WLAN.

In an aspect, a method of allocating a wireless resource based on a single resource unit in a wireless local area network (WLAN) is provided. The method includes scheduling, an AP (access point), each of a plurality of wireless resources for communication with a plurality of STAs (stations) on a bandwidth and transmitting, by the AP, each of a plurality of downlink data to each of the plurality of STAs through each of the plurality of wireless resources, wherein when resource allocation based on a virtual allocation resource unit is not supported, each of the plurality of wireless resources includes only at least one first resource unit or only at least one second resource unit, wherein a size of the first resource unit is greater than a size of the second resource unit, wherein the virtual allocation resource unit is a combination of the at least one first resource unit and the at least one second resource unit including a plurality of data tones which can be interleaved by one interleaver.

In another aspect, an access point (AP) for allocating a wireless resource based on a single resource unit in a wireless local area network (WLAN) is provided. The AP includes a RF (radio frequency) unit which transmits and receives a wireless signal and a processor which is coupled operatively with the RF unit, wherein the processor schedules each of a plurality of wireless resources for communication with a plurality of STAs (stations) on a bandwidth, wherein the process is implemented to transmit each of a plurality of downlink data to each of the plurality of STAs through each of the plurality of wireless resources, wherein when resource allocation based on a virtual allocation resource unit is not supported, each of the plurality of wireless resources comprises only at least one first resource or only at least one second resource, wherein a size of the first resource unit is greater than a size of the second resource unit, wherein the virtual allocation resource unit is a combination of the at least one first resource unit and the at least one second resource unit including a plurality of data tones which can be interleaved by one interleaver.

According to the present invention, when wireless resources for each of a plurality of STAs are allocated based on an OFDMA (orthogonal frequency division multiple access), resource allocation to each of the plurality of STAs may be performed using wireless resource units having been defined as different sizes. Hence, a scheduling flexibility can be enhanced, and the throughput of the WLAN may be increased.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
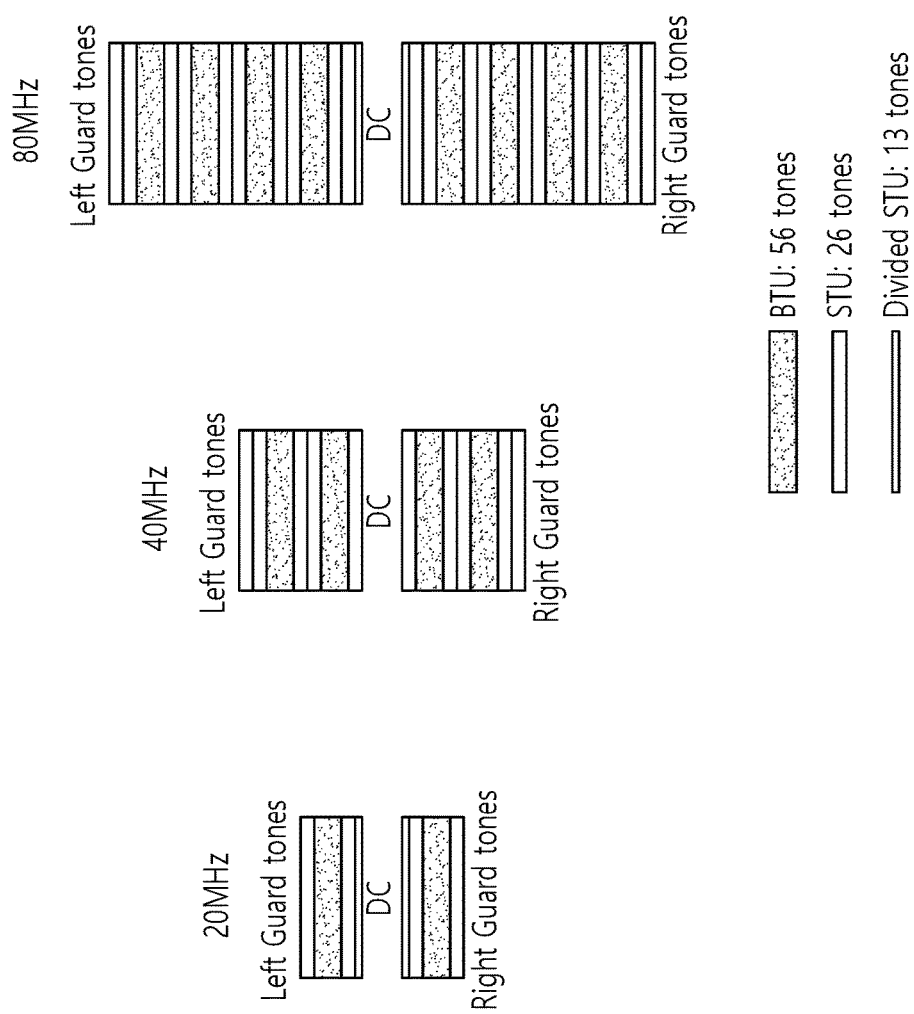
FIG. 2 is a conceptual view illustrating a method of allocating wireless resources according to an embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STAT) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs) (alternatively, basic tone units or small tone units). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the Wireless LAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared to the first part of the HE PPDU, the 4-times size of the FFT/IFFT may be applied to the second part of the HE PPDU. For example, 256 FFT/IFFT may be applied for a 20 MHz bandwidth, 512 FFT/IFFT may be applied for a 40 MHz bandwidth, 1024 FFT/IFFT may be applied for an 80 MHz bandwidth, and 2048 FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 μs and N=4, in the WirelessLAN system according to this exemplary embodiment, the IDFT/DFT length may be equal to 3.2 μs*4(=12.8 μs).

The length of an OFDM symbol may correspond to the IDFT/DFT length having a length of a guard interval (GI) added thereto. The length of the GI may have diverse values, such as 0.4 μs, 0.8 μs, 1.6 μs, 2.4 μs, and 3.2 μs.

When an OFDMA-based resource allocation method according to an embodiment of the present invention is used, the resource allocation unit defined by different sizes may be used. Specifically, a basic tone unit (BTU) and a small tone unit (STU) may be defined for the resource allocation based on the OFDMA.

The AP may determine DL transmission resource and/or UL transmission resource for at least one STA based on such various resource units. The AP may transmit at least one PPDU to at least one STA through the scheduled DL transmission resource. Further, the AP may receive at least one PPDU transmitted by at least one STA through the DL transmission resource.

In comparison with the STU, the BTU may be a relatively larger size resource unit. For example, the BTU may be defined as the size of 56 tones, 114 tones or the like. The BTU may be defined as the same size irrespective of the size of the available bandwidth (e.g., 20 MHz, 40 MHz, 80 MHz, 160 MHz, etc.) or defined as a size which is changed depending on the size of the available bandwidth. For example, the size of the BTU may be defined as a relatively large value as the size of the available bandwidth increases. The tone may be understood as the same as the subcarrier.

In comparison with the BTU, the STU may be a relatively small size resource unit. For example, the STU may be defined as the size of 26 tones.

Resource units such as BTU and STU may be allocated on the entire bandwidth (or available bandwidth) in consideration of the left guard tone and the right guard tone which are located at both ends of the entire bandwidth and are used to reduce interference, and the direct current (DC) tone located in the center of the entire bandwidth. Further, the resource units such as BTU and STU may be allocated in consideration of a leftover tone which may be used for user allocation separation (or resource allocation for each STA), a common pilot, an automatic gain control (AGC), a phase tracking, etc.

In the entire bandwidth, the allocation method (allocated number, allocation location, etc) of the resource units such as BTU and STU on the entire bandwidth may be set in consideration of the resource utilization efficiency and the scalability (or extensibility) according to the entire bandwidth. The allocation method of resource units such as BTU and STU may defined in advance or signaled based on various methods (e.g., a signaling based on a signal field included in the PPDU header of the PPDU).

Hereinafter, a specific resource allocation method based on BTU and STU will be described.

FIG. 2 is a conceptual view illustrating a method of allocating wireless resources according to an embodiment of the present invention.

FIG. 2 discloses resource allocation for all available bandwidths based on BTU and STU.

Table 1 below discloses the basic resource allocation of BTU and STU on bandwidths of 20 MHz, 40 MHz, and 80 MHz.

TABLE 1

|  | 20 MHz | 40 MHz | 80 MHz |
| --- | --- | --- | --- |
| Basic tone unit (BTU) | 56 tones | 56 tones | 56 tones |
| Small tone unit (STU) |  | 26 tones |  |
| Total # of BTUs | 2 | 4 | 8 |
| Total # of STUs | 5 | 10 | 21 |
| Total available tones (except guard/DC tones) | 242 tones | 484 tones | 994 tones |
| Possible # of BTUs allocated to a STA | 1, 2 | 1, 2 | 1, 2, 4 |
| Possible # of STUs allocated to a STA | 1, 2, 4, 5 | 1, 2, 4, 10 | 1, 2, 4, 21 |
| Maximum STA # of allocations | 7 | 14 | 29 |

Referring to FIG. 2 and Table 1, BTU may be defined as 56 tones, and STU may be defined as 26 tones. One STU may be implemented as two divided STUs corresponding to 13 tones based on the DC tone.

2 BTUs and 5 STUs may be allocated for 20 MHz bandwidth including 242 available tones. Further, 4 BTUs and 10 STUs may be allocated for 40 MHz bandwidth including 484 available tones, and 8 BTUs and 21 STUs may be allocated for 80 MHz bandwidth including 994 available tones.

1 or 2 BTUs may be allocated with one STA for 20 MHz bandwidth. Further, 1 or 2 BTUs may be allocated with 1 STA for 40 MHz bandwidth, and 1, 2 or 4 BTUs may be allocated with 1 STA for 80 MHz bandwidth.

1, 2, 4 or 5 STUs may be allocated with 1 STA for 20 MHz bandwidth. The number 5, which is the maximum number of STUs allocatable with 1 STA on 20 MHz bandwidth, may be defined as another value in consideration of the signaling for the number of STUs allocated to one STA. Further, 1, 2, 4 or 10 STUs may be allocated with 1 STA for 40 MHz bandwidth. The number 10, which is the maximum number of STUs allocatable with 1 STA on 40 MHz bandwidth, may be defined as another number in consideration of the signaling for the number of STUs allocated with 1 STA.

Further, 1, 2, 4 or 21 STUs may be allocated with 1 STA for 80 MHz bandwidth. The number 21, which is the maximum number of STUs allocatable with 1 STA on 80 MHz bandwidth, may be defined as another value in consideration of the signaling for the number of STUs allocated with 1 STA.

According to an embodiment of the present invention, a virtual allocation resource unit including a tone corresponding to a combination of at least one BTU and at least one STU may be defined, and a resource allocation based on the virtual allocation resource unit may be performed. The resource allocation based on the virtual allocation resource unit may also be called virtualization.

The virtual allocation resource unit may be a resource unit for reutilizing an interleaver size and OFDM numerology of the existing WLAN system. Further, the virtual allocation resource unit may be defined as a resource unit which is greater than that of BTU and STU and corresponds to the tone corresponding to the combination of at least one BTU and at least one STU. For example, the virtual allocation resource unit may be 242 tones which is the combination of 2 BTUs and 5 STUs and 484 tones which is the combination of 4 BTUs and 10 STUs.

Specifically, when 242 tones corresponding to 2 BTUs and 5 STUs are allocated to one STA, the existing pilot allocation and the existing interleaver size may be utilized. Specifically, the pilot tone may be allocated to 8 tones among 242 tones, and the data tone may be allocated to the remaining 234 tones. An interleaving based on the interleaver of 234 size may be performed for the 234 data tones.

In such a case, a data interleaving procedure and a pilot tone insertion procedure may be performed in the same manner as that of the existing STA having been allocated 242 tones. Namely, even when the 242 tone structure is not physically supported, the resource unit of one virtual 242 tones may be allocated to the STA. In such a case, the interleaving procedure which utilizes the existing interleaver of the 234 size and the insertion procedure of the existing pilot tones (8 pilot tones) may be used. Such a 242 tone resource unit may be expressed as the term "virtual allocation resource unit". The virtual allocation resource unit may be 242 tones or a multiple number of 242 tones (e.g., 484, 968, etc.). Further, the size of the virtual allocation resource unit may be determined based on another interleaver size (108, 52, 24, etc.) having been used in the existing WLAN system. Further, the virtual allocation resource unit may be defined as a resource unit greater than that of BTU and STU corresponding to the tone corresponding to the combination of at least one BTU and at least one STU and may include a plurality of data tones interleaved by a newly defined interleaver size.

Such a virtual allocation resource unit may be utilized for transmission based on SU (single) OFDMA. Further, all BTUs and all STUs defined in each bandwidth with respect to one STA may be allocated for transmission based on SU OFDMA.

The maximum number of STAs which may be simultaneously allocated resources in 20 MHz bandwidth may be 7. Each of the maximum 7 STAs may be allocated each of 2 BTUs and 5 STUs. The maximum number of STAs which may be allocated resources in 40 MHz bandwidth may be 14. Each of the maximum 14 STAs may be allocated each of 4 BTUs and 10 STUs. The maximum number of STAs which may be allocated resources in 80 MHz may be 29. Each of 29 STAs may be allocated each of 8 BTUs and 21 STUs. Further, the maximum number of STAs which may be allocated resources in the entire bandwidth may be limited to a number smaller than 29 (e.g., 20), and in such a case, the maximum 19 STAs may be simultaneously allocated resources based on the combination of 8 BTUs and 21 STUs in 80 MHz.

Figure 3:
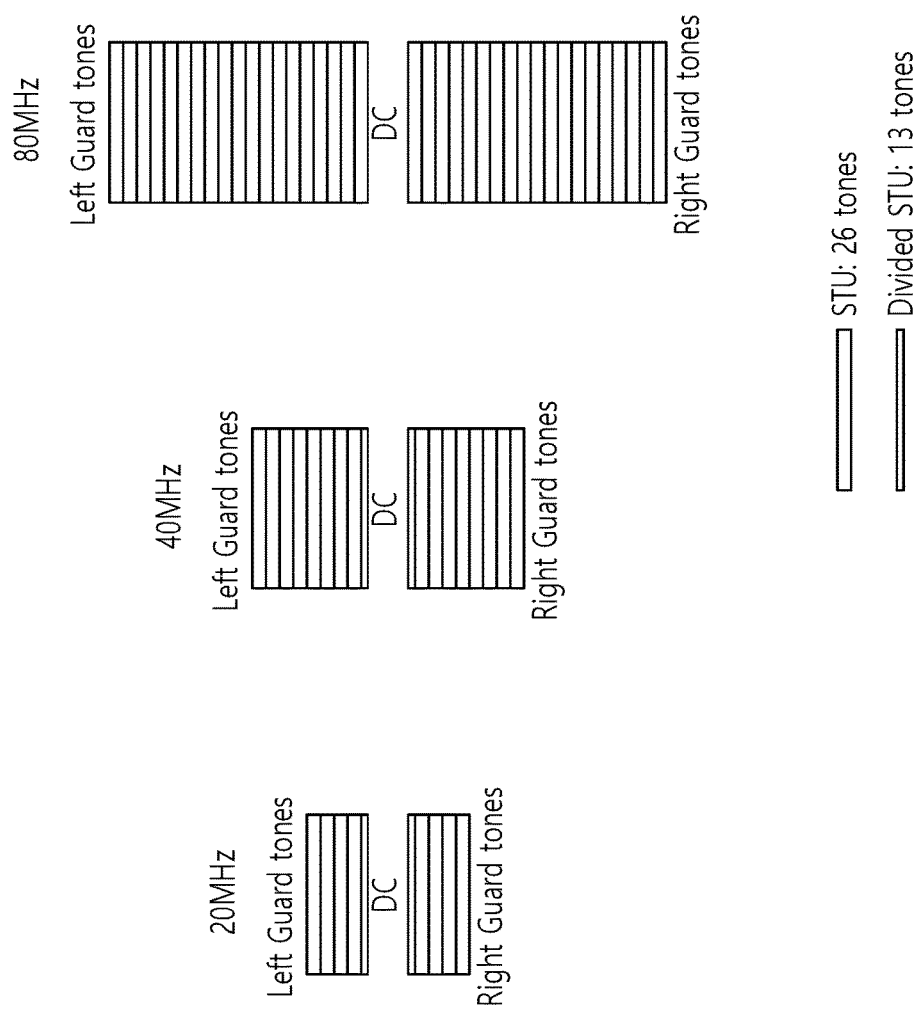
FIG. 3 is a conceptual view illustrating a method of allocating wireless resources according to an embodiment of the present invention.

FIG. 3 is a conceptual view illustrating a method of allocating wireless resources according to an embodiment of the present invention.

FIG. 3 discloses a method of performing resource allocation for all available bandwidths with one tone type unit. In particular, a method of performing resource allocation for all available bandwidths using only STU is disclosed.

Table 2 below discloses resource allocation of STU on 20 MHz, 40 MHz, and 80 MHz bandwidths.

TABLE 2

|  | 20 MHz | 40 MHz | 80 MHz |
|---|---|---|---|
| Basic tone unit (BTU) | 56 tones | 56 tones | 56 tones |
| Small tone unit (STU) |  | 26 tones |  |
| Total # of BTUs |  |  |  |
| Total # of STUs | 9 | 19 | 38 |
| Total available tones (except guard/DC tones) | 234 tones | 494 tones | 988 tones |
| Possible # of BTUs allocated to a STA | N/A(not applicable) | 2, 4 (only for virtualization) | 2, 4 (only for virtualization) |
| Possible # of STUs allocated to a STA | 1, 2, (3), 4, . . . , 9 | 1, 2, (3), 4, . . . , (19) | 1, 2, (3), 4, . . . , (38) |
| Maximum STA # of allocations | 9 | 19 | 38 |

Referring to FIG. 3 and Table 2, BTU may be defined as 56 tones, and STU may be defined as 26 tones. When the resource composed of only STU is allocated to STA, BTU may be used for only the allocation of the virtual allocation resource unit to STA.

Only STUs may be allocated for 20 MHz bandwidth including 234 available tones. Further, 19 STUs may be allocated for 40 MHz bandwidth including 494 available tones, and 38 STUs may be allocated for 80 MHz bandwidth including 989 available tones.

Allocation of BTU to one STA for 20 MHz bandwidth may be impossible. Further, 2 or 4 BTUs to 1 STA for 40 MHz may be allocated, but such allocation of BTUs may be applied when the virtual allocation resource unit is allocated with STA only. Likewise, 2 or 4 BTUs may allocated to one STA for 80 MHz bandwidth, but such allocation of BTUs may be applied when the virtual allocation resource unit is allocated with STA only.

The number of STUs which may be allocated with one STA for 20 MHz bandwidth may be one of 1, 2, 3, 4, 5, 6, 7, 8, and 9, but some of these values (e.g., 3, 9, etc.) may be exempted for the convenience of signaling.

The number of STAs allocatable to one STA for 40 MHz may be one of 1, 2, 3, 4, 5, 6, 7, 8, 9, 10, 11, 12, 13, 14, 15, 16, 17, 18, and 19, but some of these values (e.g., 3, 19, etc.) may be exempted for the convenience of signaling.

The number of STAs allocatable to one STA for 80 MHz may be one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, and 38 but some of these values (e.g., 3, 38, etc.) may be exempted for the convenience of signaling.

The maximum number of STAs which may be simultaneously allocated resources in 20 MHz bandwidth may be 9. Each of the maximum 9 STAs may be allocated each of 9 STUs. The maximum number of STAs which may be simultaneously allocated resources in 40 MHz may be 19. Each of the maximum 19 STAs may be allocated each of 19 STUs. The maximum number of STAs which may be simultaneously allocated in 80 MHz may be 38. Each of 38 STAs may be allocated each of 38 STUs. Further, the maximum number of STAs which may be simultaneously allocated resources on the entire bandwidth may be limited to a value equal to or smaller than 20 (e.g., 18 or 20) in consideration of the signaling overhead, and in such a case, the maximum 18 or 20 STAs may be simultaneously allocated resources based on the combination of 38 STUs in 80 MHz bandwidth.

In 40 MHz bandwidth and 80 MHz which support transmission of a relatively large amount of data, the resource allocation may be performed based on the resource allocation method disclosed in FIG. 2 and Table 1, and in 20 MHz bandwidth which supports transmission a relatively small amount of data, the resource allocation may be performed based on the resource allocation method disclosed in FIG. 3 and Table 2.

Figure 4:
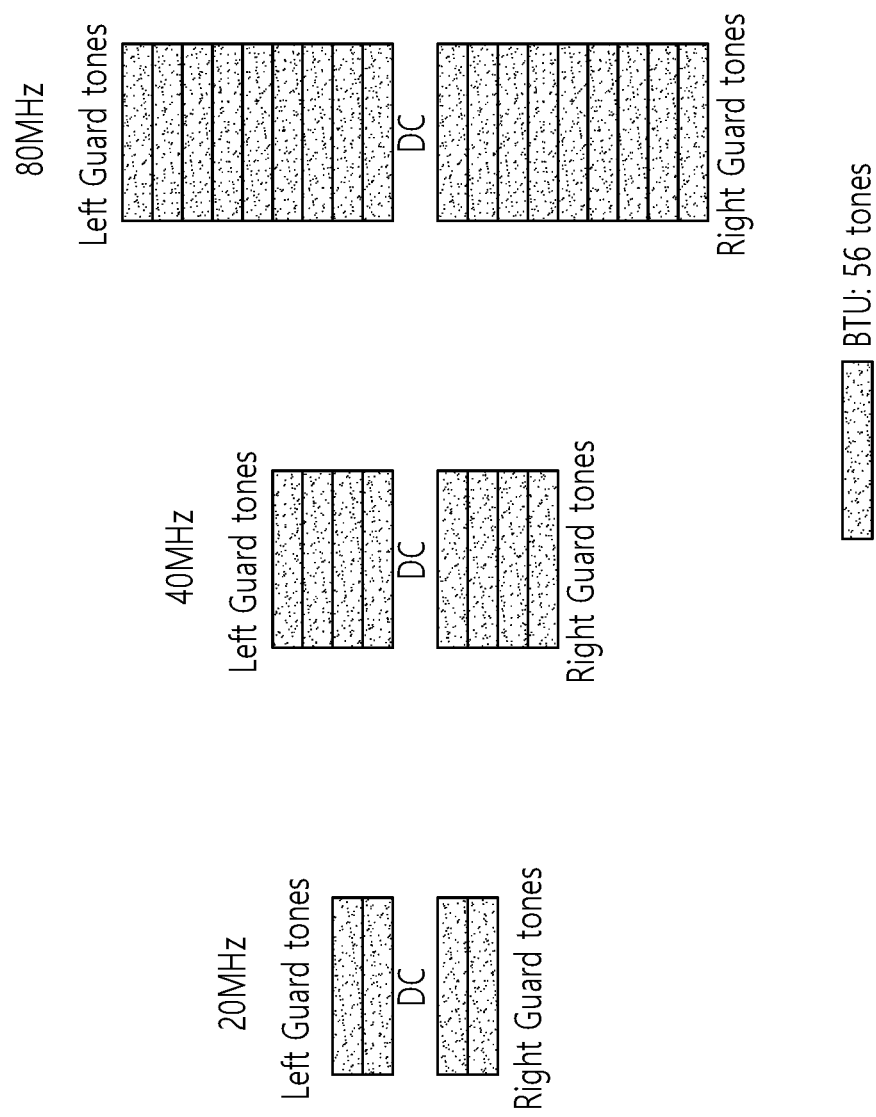
FIG. 4 is a conceptual view illustrating a method of allocating wireless resources according to an embodiment of the present invention.

FIG. 4 is a conceptual view illustrating a method of allocating wireless resources according to an embodiment of the present invention.

FIG. 4 discloses a method of performing resource allocation for all available bandwidths with one tone type unit. Particularly, the method of performing resource allocation for all available bandwidths using only BTU is disclosed.

Table 3 discloses resource allocation of BTU on 20 MHz, 40 MHz and 80 MHz bandwidths.

TABLE 3

|  | 20 MHz | 40 MHz | 80 MHz |
|---|---|---|---|
| Basic tone unit (BTU) | 56 tones | 56 tones | 56 tones |
| Small tone unit (STU) |  | 26 tones |  |
| Total # of BTUs | 4 | 8 | 17 or 18 |
| Total # of STUs |  |  |  |
| Total available tones (except guard/DC tones) | 224 tones | 448 tones | 952 tones or 1008 tones |
| Possible # of BTUs allocated to a STA | 1, 2, (3), 4 | 1, 2, (3), 4, . . . , 8 | 1, 2, (3), 4, . . . , 17 or 18 |
| Possible # of STUs allocated to a STA |  | 5, 10 (only for virtualization) | 5, 10 (only for virtualization) |
| Maximum STA # of allocations | 4 | 8 | 17 or 18 |

Referring to FIG. 4 and Table 3, BTU may be defined as 56 tones, and STU may be defined as 26 tones. When the resource composed of only BTU is allocated to STA, STU may be used only to support allocation of the virtual allocation resource unit.

Only 4 BTUs may be allocated for 20 MHz bandwidth including 224 available tones. Further, 8 BTUs may be allocated for 40 MHz bandwidth including 448 available tones, and 17 or 18 BTUs may be allocated for 80 MHz bandwidth including 952 or 1008 tones.

1, 2, 3 or 4 BTUs may be allocated with one STA for 20 MHz bandwidth, but some of these values (e.g., 3) may be exempted for the convenience of signaling. 1, 2, 3, 4, 5, 6, 7 or 8 BTUs may be allocated with one STA for 40 MHz bandwidth, but some of these values (e.g., 3) may be exempted for the convenience of signaling. 1, 2, 3, 4, 5, 6, 7, 8, 9, 10, 11, 12, 13, 14, 15, 16, 17 or 18 BTUs may be allocated with one STA for 80 MHz bandwidth, but some of these values (e.g., 3) may be exempted for the convenience of signaling.

STUs may not be allocated with one STA for 20 MHz. The number of STUs allocatable with one STA for 40 MHz may be 5 or 10, and the STUs may be used for only the allocation of the virtual allocation resource unit. Further, the number of STUs allocatable with one STA for 80 MHz may be 5 or 10, and the STUs may be used for only the allocation of the virtual allocation resource unit.

The maximum number of STAs which may be simultaneously allocated resources in 20 MHz may be 4. Each of the maximum 4 STAs may be each of 4 BTUs. The maximum number of STAs which may be simultaneously allocated resources in 40 MHz may be 8. Each of the maximum 8 STAs may be each of 8 BTUs. The maximum number of STAs which may be simultaneously allocated resources in 80 MHz may be 17 or 18. Each of 17 or 18 STAs may be each of 17 or 18 BTUs.

In 20 MHz bandwidth which supports transmission of a relatively small amount of data, the resource allocation method based on only STUs disclosed in FIG. 3 and Table 2 may be used to perform resource allocation for STA, and in 40 MHz and 80 MHz bandwidths which support transmission of a relatively large amount of data, the resource allocation method based on only BTUs disclosed in FIG. 4 and Table 3 may be used to perform resource allocation for STA.

According to an embodiment of the present invention, information on whether the resource allocation based on only BTU is performed or the resource allocation based on only STU is performed may be included in the signal field (e.g., HE-SIG A/B) of the PPDU header. Further, the signaling for the resource allocation may be changed depending on whether the resource allocation based on only BTU is performed or the resource allocation based on only STU is performed. For example, when the resource allocation based on only STU is performed for 20 MHz bandwidth, bit information for indicating the resource allocation for each of 9 STUs may be signaled. If the size of BTU is 242 tone unit or a unit corresponding to the 20 MHz frequency band, information indicating the resource allocation may be compressed and signaled, and the information indicating resource allocation may not be separately transmitted. When the resource allocation based on only BTU is performed for 20 MHz bandwidth, bit information for indicating the resource allocation for each of 4 BTUs may be signaled. STA may analyze resource allocation information transmitted from AP based on whether the resource allocation based on only BTU is performed or the resource allocation based on only STU is performed.

Figure 5:
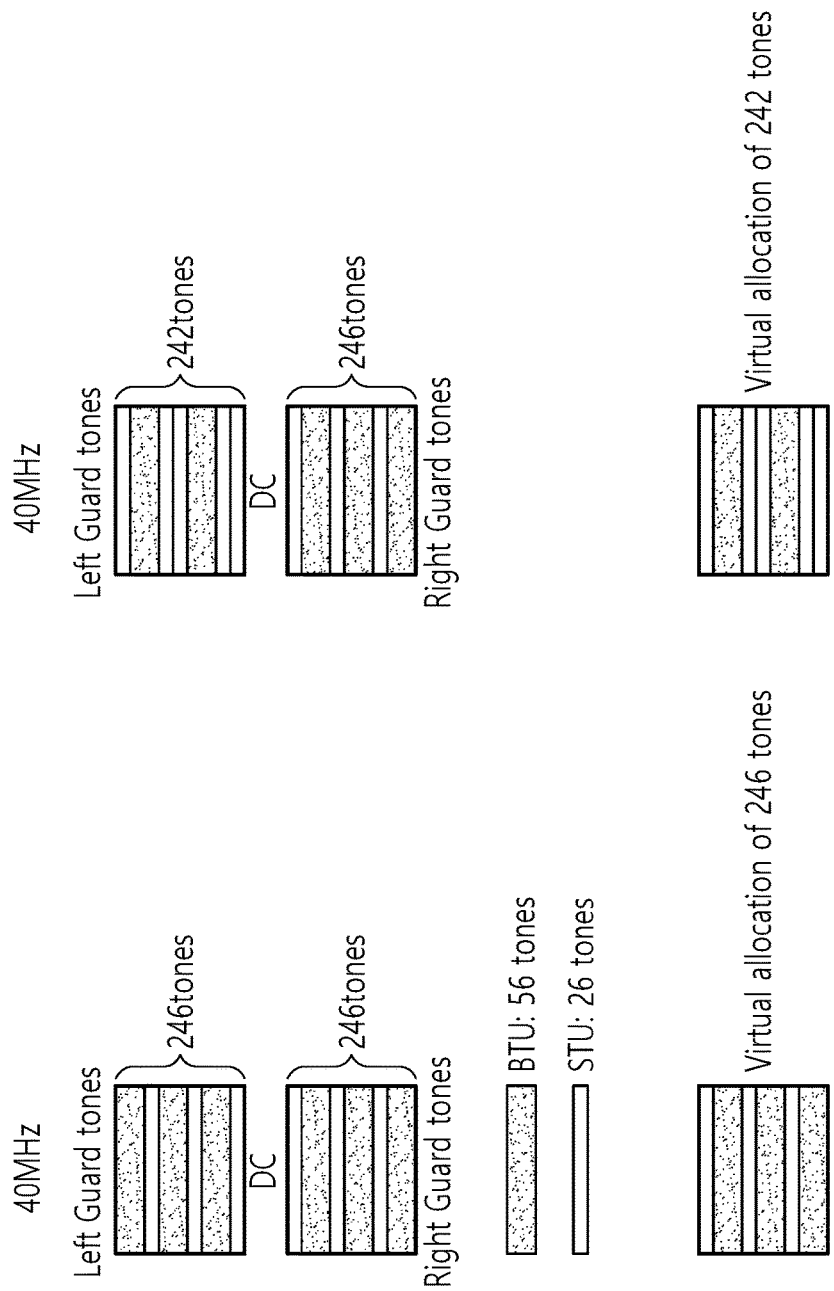
FIG. 5 is a conceptual view illustrating a method of allocating wireless resources according to an embodiment of the present invention.

FIG. 5 is a conceptual view illustrating a method of allocating wireless resources according to an embodiment of the present invention.

FIG. 5 discloses a method for increasing the total number of usable tones (available tones) on bandwidth using the virtual allocation resource unit based on the combination of at least one BTU and at least one STU.

Referring to the left side of FIG. 5, the virtual allocation resource unit of 246 tones corresponding to 2 BTUs (56 tones) and 3 STUs (26 tones) may be allocated to 40 MHz bandwidth. In the 246 tone virtual allocation resource unit, only 242 tones may be used as data tones and pilot tones, and 4 tones may be the remaining tones (or leftover tones). Hence, the interleaving procedure for the data tone which utilizes the existing 234 size interleaver and the insertion procedure of the existing pilot tones (8 pilot tones) may be used for the 246 tone virtual allocation resource unit.

Two virtual allocation resource units of 246 tones may be allocated to 492 tones and operated on 40 MHz bandwidth. In 512 tones corresponding to 40 MHz bandwidth, 20 remaining tones except 492 tones corresponding to the virtual allocation resource unit may be used as the guard tone or DC (direct current) tone. 20 remaining tones may be allocated to 11 left guard tones/right guard tones (or leftmost tone)/rightmost tone and 9 DC tones.

Further, in order to reduce the number of DC tones and relieve the interference, the additional guard tone may be allocated between the virtual allocation resource unit or 20 MHz unit bandwidth (or virtual allocation resource unit).

Further, the 242 tone virtual allocation resource unit corresponding to 2 BTUs (56 tones) and 5 STUs (26 tones) may be allocated to 40 MHz bandwidth. Namely, a specific STA may be allocated the virtual allocation resource unit of 246 tones, and another STA may be allocated the virtual allocation resource unit of 242 tones. Further, the virtual allocation resource unit of 264 tones or the virtual allocation resource unit of 242 tones may be selectively used on the available bandwidth.

Referring to the right side of FIG. 5, as a specific example, on the all available 492 tones of 40 MHz bandwidth, the virtual allocation resource unit of 242 tones may be allocated for the first STA, and the virtual allocation resource unit of 246 tones may be allocated for the second STA. In such a case, in the virtual allocation resource unit of 246 tones, only 242 tones are used as the data tones and pilot tones, and the remaining 4 tones (246−242=4 tones) may be used for another purpose. For example, the remaining tones may be used as guard tones and the common control signal for measurement. Further, the remaining 4 tones may be used for the channel tracking pilot for CFO (channel frequency offset) measurement/compensation.

When the virtual allocation resource unit of a plurality of 246 tones is used for another bandwidth (e.g., 80 MHz), the size of the remaining tones may be a multiple number of 4 tones, and the remaining tones corresponding to the multiple number of 4 tones may also be used for the above-described purpose.

Figure 6:
FIG. 6 is a conceptual view illustrating a method of allocating wireless resources according to an embodiment of the present invention.

FIG. 6 is a conceptual view illustrating a method of allocating wireless resources according to an embodiment of the present invention.

FIG. 6 discloses a method for increasing the number of total usable tones on the bandwidth using the virtual allocation resource unit based on at least one BTU and at least one STU.

Referring to the left side of FIG. 6, the virtual allocation resource unit of 250 tones corresponding to 4 BTUs (56 tones) and 1 STU (26 tones) may be allocated to 80 MHz bandwidth. In the 250 tone virtual allocation resource unit, only 242 tones may be used as data tones and pilot tones, and 8 tones may be the remaining tones (or leftover tones). Hence, the interleaving procedure for the data tone which utilizes the existing 234 size interleaver and the insertion procedure of the existing pilot tones (8 pilot tones) may be used for the 250 tone virtual allocation resource unit.

For example, 4 virtual allocation resource units of 250 tones may be allocated to 1000 tones and operated on 80 MHz bandwidth. In 1024 tones corresponding to 80 MHz bandwidth, 24 remaining tones except 1000 tones corresponding to the virtual allocation resource unit may be used as the guard tone or DC (direct current) tone. 24 remaining tones may be allocated to 11 left guard tones/right guard tones (or leftmost tone)/rightmost tone and 13 DC tones.

Further, in order to reduce the number of DC tones and relieve interference, the additional guard tone may be allocated between the virtual allocation resource unit or 20 MHz unit bandwidth (or virtual allocation resource unit).

Further, the 242 tone virtual allocation resource unit corresponding to 2 BTUs (56 tones) and 5 STUs (26 tones) may be allocated to 80 MHz bandwidth. Namely, on the available bandwidth, a specific STA may be allocated the virtual allocation resource unit of 250 tones, and another STA may be allocated the virtual allocation resource unit of 242 tones. Further, the virtual allocation resource unit of 250 tones or the virtual allocation resource unit of 242 tones may be used.

Referring to the right side of FIG. 6, as a specific example, on the all available 1024 tones of 80 MHz bandwidth, the virtual allocation resource unit of 250 tones may be allocated for at least one STA, and the virtual allocation resource unit of 242 tones may be allocated for at least one STA. When the virtual allocation resource unit of 250 tones is used, the remaining 8 tones (250 tones-242 tones) may be used for another purpose. For example, the remaining 8 tones may be used as the guard tones or a general control signal for measurement. Further, the tones may be used as a channel tracking pilot for CFO (channel frequency offset) measurement/compensation.

When a plurality of virtual allocation resource units of 250 tones are used for another bandwidth (e.g., 160 MHz), the size of the remaining tones may be a multiple number of 8 tones, and the remaining tones corresponding to the multiple number of 8 tones may also be used for the above description. For example, when four 250 tones are allocate, the size of the all remaining tones may become 32 tones which is the four times of 8 tones, and 32 tones which is the set of all remaining tones may be utilized as the STU of 26 tone size so as to be allocated to STA.

Figure 7:
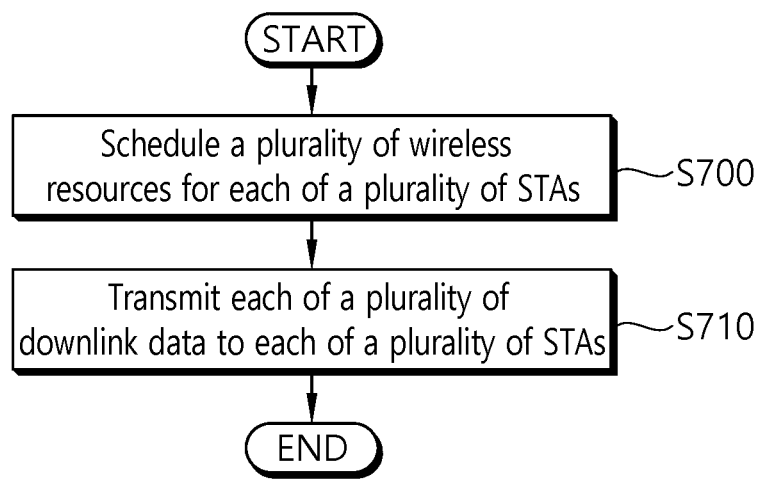
FIG. 7 is a flowchart illustrating a method of scheduling wireless resources according to an embodiment of the present invention.

FIG. 7 is a flowchart illustrating a method of scheduling wireless resources according to an embodiment of the present invention.

FIG. discloses a method of scheduling, by an AP, wireless resources based on BTU and/or STU.

The AP schedules each of the plurality of wireless resources for communication with a plurality of STAs on the bandwidth (step S700).

When the resource allocation based on the virtual allocation resource unit is not supported, each of the plurality of wireless resources may include only at least one first resource unit or only at least one second resource unit. The size of the first resource unit may be greater than the size of the second resource unit. The virtual allocation resource unit may be a combination of the at least one first resource unit and the at least one second resource unit which include a plurality of data ones and may be interleaved by one interleaver.

According to an embodiment of the present invention, when the size of the bandwidth is the first bandwidth size (e.g., 40 MHz or 80 MHz), each of the plurality of wireless resources includes only at least one first resource unit, and when the size of the bandwidth is a second bandwidth size (e.g., 20 MHz) smaller than the first bandwidth size, each of the plurality of wireless resources may include at least one second resource unit.

For example, the first resource unit may be BTU corresponding to 56 tones, and each of the plurality of wireless resources for communication with a plurality of STAs may include at least one first resource unit. Assuming the case that each of the plurality of wireless resources includes at least one first resource unit, the allocation of the first resource unit according to the size of the bandwidth is as follows. When the size of the bandwidth is 20 MHz, each of a plurality of wireless resources for communication with a plurality of STAs corresponds to at least one BTU among 4 BTUs. When the size of the bandwidth is 40 MHz, each of the plurality of wireless resources for communication with a plurality of STAs corresponds to at least one BTU among 8 BTUs. When the size of the bandwidth is 80 MHz, each of the plurality of wireless resources for communication with a plurality of STAs corresponds to at least one BTU among 17 or 18 BTUs.

As another example, the second resource unit is a STU corresponding to 26 tones, and each of a plurality of wireless resources for communication with a plurality of STAs may include only at least one second resource unit. Assuming the case that each of the plurality of wireless resources includes only at least one second resource unit, the allocation of the second resource unit according to the size of the bandwidth is as follows. When the size of the bandwidth is 20 MHz, each of a plurality of wireless resources corresponds to at least one STU among 9 STUs. When the size of the bandwidth is 40 MHz, each of the plurality of wireless resources corresponds to at least one STU among 19 STUs. When the size of the bandwidth is 80 MHz, each of the plurality of wireless resources corresponds at least one of 38 STUs.

Further, as described above, the size of the virtual allocation resource unit may be one of 242 tones corresponding to the combination of 2 BTUs and 5 STUs, 246 tones corresponding to 3 BTUs and 5 STUs, and 250 tones corresponding to the combination of 4 BTUs and 1 STU.

The AP transmits each of the plurality of downlink data to each of the plurality of STAs through each of the plurality of wireless resources (step S710).

A plurality of downlink data (or downlink PPDU) may be transmitted to each of the plurality of STAs through each of the plurality of wireless resources scheduled by step S700.

Figure 8:
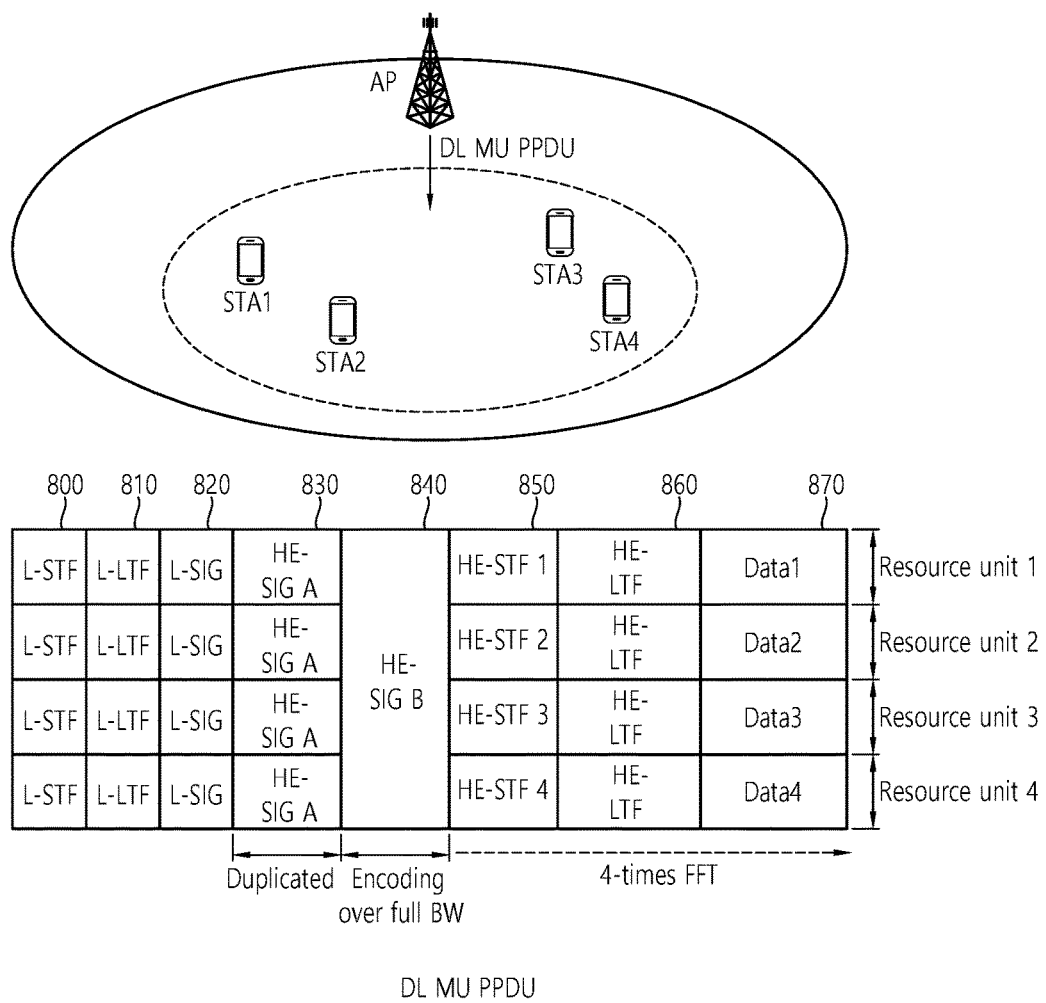
FIG. 8 is a conceptual view illustrating a DL MU PPDU format according to an embodiment of the present invention.

FIG. 8 is a conceptual view illustrating a DL MU PPDU format according to an embodiment of the present invention.

FIG. 8 discloses a DL MU PPDU format transmitted based on OFDMA by AP according to an embodiment of the present invention.

Referring to FIG. 8, the PPDU header of DL MU PPDU may include L-STF (legacy-short training field), L-LTF (legacy-long training field), L-SIG (legacy-signal), HE-SIG A (high efficiency-signal A), HE-SIG B (high efficiency-signal-B), HE-STF (high efficiency-short training field), HE-LTF (high efficiency-long training field), and a data field (MAC payload). From PHY header to L-SIG may be divided into legacy parts and HE (high efficiency) part.

A L-SFT 800 may include a short training orthogonal frequency division multiplexing (OFDM) symbol. The L-SFT 800 may be used for frame detection, AGC (automatic gain control), diversity detection, and coarse frequency/time synchronization.

The L-LTF 810 may include a long training orthogonal frequency division multiplexing (OFDM) symbol. The L-LTF 810 may be used for fine frequency/time synchronization and channel prediction.

The L-SIG 820 may be used to transmit control information. The L-SIG 820 may include information on the data transmission rate and the data length.

The HE-SIG A 830 may include information for indicating STA for receiving DL MU PPDU. For example, HE-SIG A 830 may include information for indicating an identifier of a specific STA (or AP) to receive PPDU and a group of a specific STA. Further, when the DL MU PPDU is transmitted based on OFDMA or MIMO, the HE-SIG A 830 may include resource allocation information for reception of DL MU PPDU of STA.

Further, the HE-SIG A 830 may include color bits information for BSS identification information, bandwidth information, a tail bit, a CRC bit, MCS (modulation and coding scheme) information for HE-SIG B 840, information on the number of symbols for HE-SIG B 840, and CP (cyclic prefix) (or GI (guard interval)) length information.

The HE-SIG B 840 may include information on the length MCS of the PSDU (physical layer service data unit) for each STA and a tail bit. Further, the HE-SIG B 840 may include information on the STA to receive PPDU and OFDMA-based resource allocation information (or MU-MIMO information). When the OFDMA-based resource allocation information (or MU-MIMO-related information) is included in the HE-SIG B 840, the resource allocation information may not be included in the HE-SIG A 830.

The HE-SIG A 850 or HE-SIG B 860 may include resource allocation information (or virtual resource allocation information) for each of the plurality of STAs and resource allocation information such as information on whether resource allocation which uses only BTU or STU is performed.

The previous field of HE-SIG B 840 may be transmitted in the duplicated form in each of different transmission resources. In the case of HE-SIG B 840, HE-SIG B 840, which is transmitted in some resource units (e.g., resource unit 1 and resource unit 2), is an independent field including individual information, and the HE-SIG B 840, which is transmitted in the remaining resource units (e.g., resource unit 3 and resource 4), may be a format having duplicated the HE-SIG B 840 which is transmitted in other resource units (e.g., resource unit 1 and resource unit 2). Further, the HE-SIG B 840 may be transmitted in the form which is encoded on all transmission resources. The field after HE-SIG B 840 may include individual information for each of the plurality of STAs receiving PPDU.

The HE-STF 850 may be used to improve an automatic gain control estimation in a MIMO (multiple input multiple output) environment or OFDMA environment.

Specifically, STA1 may receive HE-STF-1 transmitted from AP through resource unit 1 and decode data field 1 by performing synchronization, channel tracking/prediction, and AGC. Likewise, STA2 may receive HE-STF2 transmitted from AP through resource unit 2 and decode data field 2 by performing synchronization, channel tracking/prediction and AGC. STA3 may receive HE-STF3 transmitted from AP through resource unit 3 and decode data field 3 by performing synchronization, channel tracking/prediction, and AGC. STA4 may receive HE-STF4 transmitted from AP through resource unit 4 and decode data field 4 by performing synchronization, channel tracking/prediction, and AGC.

A HE-LTF 860 may be used to estimate the channel in MIMO environment or OFDMA environment.

The size of IFFT applied to HE-STF 850 and the field after HE-STF 850 may be different from the size of IFFT applied to the field before HE-STF 850. For example, the size of IFFT applied to HE-STF 850 and the field after HE-STF 850 may be greater than the size of IFFT applied to the field before HE-STF 805 by 4 times. STA may receive HE-SIG A 830 and may be directed to receive downlink PPDU based on the HE-SIG A 830. In such a case, STA may perform a decoding based on the FFT size which has been changed from HE-STF 850 and the field after HE-STF 850. In contrast, if the STA is not directed to receive downlink PPDU based on HE-SIG A 830, the STA may stop decoding and set NAV (network allocation vector). The CP (cyclic prefix) of HE-STF 850 may have a size greater than that of the CP of another field, and during such a CP section, the STA may change the FFT size so as to perform the decoding for the downlink PPDU.

The AP (access point) may allocate each of the plurality of wireless resources for each of the plurality of STAs (stations) on the entire bandwidth and may transmit PPDU (physical protocol data unit) to each of the plurality of STAs through each of the plurality of wireless resources. Information on allocation of each of the plurality of wireless resources for each of the plurality of STAs may be included in HE-SIG A 850 and HE-SIG B 860 as described above.

At this time, each of the plurality of wireless resources may be a combination of a plurality of wireless units (BTU, STU) defined as different sizes on the frequency axis. As described above, the resource allocation combination may be a combination of at least one resource unit allocatable on all available tones according to the size of the bandwidth.

Figure 9:
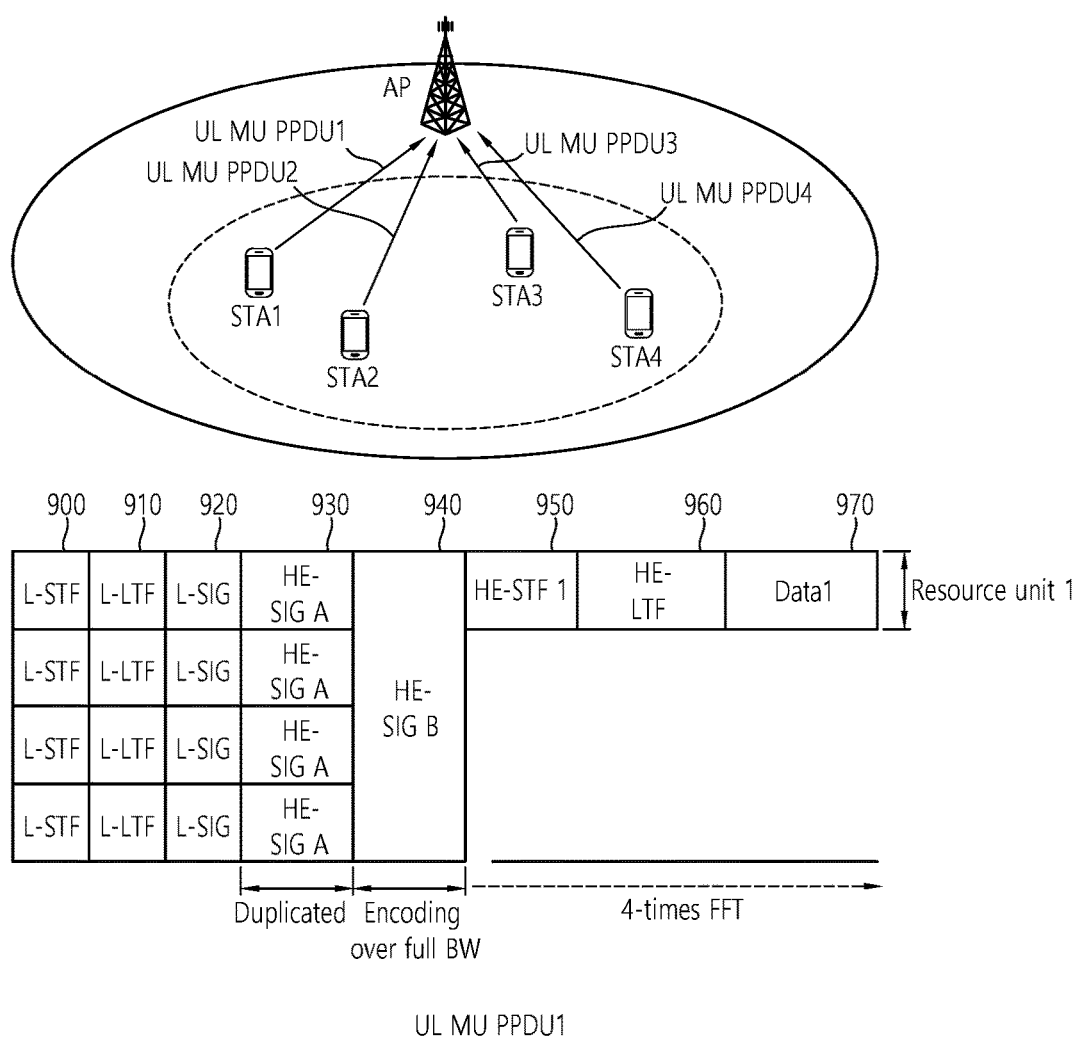
FIG. 9 is a conceptual view illustrating transmission of a UL MU PPDU according to an embodiment of the present invention.

FIG. 9 is a conceptual view illustrating transmission of a UL MU PPDU according to an embodiment of the present invention.

Referring to FIG. 9, a plurality of STAs may transmit UL MU PPDU to AP based on UL MU OFDMA.

L-STF 800, L-LTF 910, L-SIG 920, HE-SIG A 930, and HE-SIG B 940 may play a role disclosed in FIG. 8. Information included in the signal field (L-SIG 920, HE-SIG A 930, and HE-SIG B 940) may be generated based on information included in the signal field of received DL MU PPDU.

STA1 may perform uplink transmission through the entire bandwidth up to HE-SIG B 940, and from HE-STF 950, uplink transmission may be performed through the allocated bandwidth. STA1 may transmit the uplink frame based on UL MU PPDU through the allocated bandwidth (e.g., resource unit 1). AP may allocate the uplink resource of each of the plurality of STAs based on DL MU PPDU (e.g., HE-SIG A/B), and each of the plurality of STAs may be allocated the uplink resource and transmit UL MU PPDU.

Figure 10:
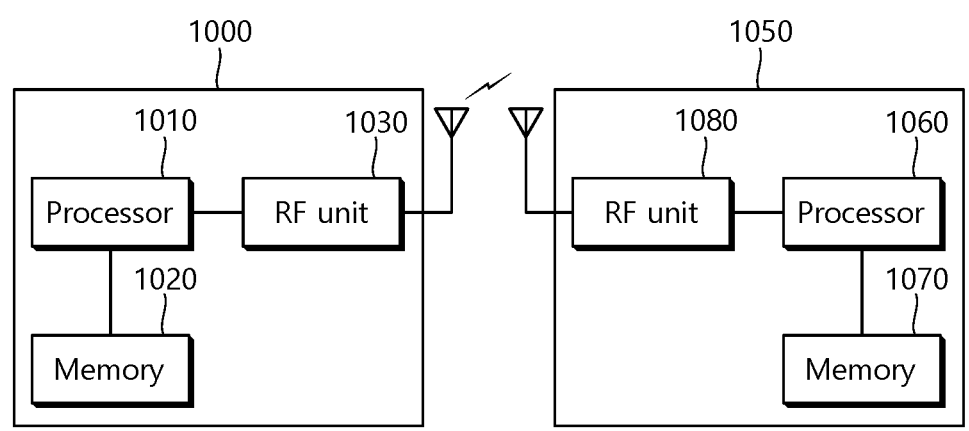
FIG. 10 is a block diagram illustrating a wireless apparatus to which an embodiment of the present invention is applicable.

FIG. 10 is a block diagram illustrating a wireless apparatus to which an embodiment of the present invention is applicable.

Referring to FIG. 10, is a STA capable of implementing the above-described embodiment and may be an AP 1000 or a non-AP STA 1050.

The AP 1000 includes a processor 1010, a memory 1020, and a RF (radio frequency) unit.

The RF unit 1030 may be connected to the processor 1010 and transmit/receive a wireless signal.

The processor 1010 may implement the function, process and/or method proposed in the present invention. For example, the processor 1010 may be implemented to operate the operation of the AP according to an embodiment of the present invention. The processor may perform the operation of the AP disclosed in embodiments of FIGS. 1 to 9.

For example, the processor 1010 may be implemented to schedule each of the plurality of wireless resources for communication with a plurality of STAs on the bandwidth and transmit each of a plurality of downlink data to each of the plurality of STAs through each of the plurality of wireless resources.

When the resource allocation based on the virtual allocation resource unit is not supported, each of the plurality of wireless resources may include only at least one first resource unit or only at least one second resource unit, the size of the first resource unit is greater than the size of the second resource unit, and the virtual allocation resource unit may be a combination of at least one first resource unit and at least one second resource unit including a plurality of data tones which may be interleaved by one interleaver. Here, the first resource unit may be BTU, and the second resource unit may be STU.

The STA 1050 includes a processor 1060, a memory 1070, and a RF (radio frequency) unit 1080.

The RF unit 1080 may be connected to the processor 1060 and transmit/receive a wireless signal.

The processor 1060 may implement the function, process and/or method proposed in the present invention. For example, the processor 1060 may be implemented to operate the operation of the STA according to an embodiment of the present invention. The processor may perform the operation of the STA disclosed in embodiments of FIGS. 1 to 9.

For example, the processor 1060 may be implemented to decode scheduling information for BTU and STU included in DL PPDU, or virtual allocation resource unit, receive downlink data, and transmit uplink data.

The processor 1010 or 10160 may include an ASIC (application-specific integrated circuit), another chipset, a logic circuit, a data processing device, and/or a converter for converting a baseband signal and a wireless signal. The memory 1020 or 1070 may include a ROM (read-only memory), a RAM (random access memory), a flash memory, a memory card, a storage medium, and/or another storage device. The RF unit 1030 or 1080 may include one or more antennas for transmitting and/or receiving a wireless signal.

When an embodiment is implemented as software, the above-described scheme may be implemented as a module for performing the above-described function (process, function, etc.). The module may be stored in the memory 1020 or 1070 and be executed by the processor 1010 or 1060. The memory 1020 or 1070 may be inside or outside the processor 1010 or 1060 or may be connected to the processor 1010 or 1060 by various well known means.

What is claimed is:

1. A method of allocating a wireless resource based on a single resource unit in a wireless local area network (WLAN), the method comprising:
   scheduling, by an AP (access point), each of a plurality of wireless resources for communication with a plurality of STAs (stations) on a bandwidth; and
   transmitting, by the AP, each of a plurality of downlink data to each of the plurality of STAs through each of the plurality of wireless resources,
   wherein when resource allocation based on a virtual allocation resource unit is not supported, each of the plurality of wireless resources includes only at least one first resource unit or only at least one second resource unit,
   wherein a size of the first resource unit is greater than a size of the second resource unit, and
   wherein the virtual allocation resource unit is a combination of the at least one first resource unit and the at least one second resource unit including a plurality of data tones which can be interleaved by one interleaver.

2. The method of claim 1, wherein the first resource unit is a basic tone unit (BTU) corresponding to 56 tones,
   wherein each of the plurality of wireless resources comprises only the at least one first resource unit and when a size of the bandwidth is 20 MHz, each of the plurality of wireless resources corresponds to at least one BTU among 4 BTUs,
   wherein each of the plurality of wireless resources comprises only the at least one first resource unit and when the size of the bandwidth is 40 MHz, each of the plurality of wireless resources corresponds to at least one BTU among 8 BTUs, and
   wherein when each of the plurality of wireless resources comprises only the at least one first resource unit and when the size of the bandwidth is 80 MHz, each of the plurality of wireless resources corresponds to at least one BTU among 17 or 18 BTUs.

3. The method of claim 2, wherein the second resource unit is a STU (small tone unit) corresponding to 26 tones,
   wherein each of the plurality of wireless resources comprises only the at least one second resource unit and the size of the bandwidth is 20 MHz, each of the plurality of wireless resources corresponds to at least one STU among 9 STUs,
   wherein each of the plurality of wireless resources comprises only the at least one second resource unit and the size of the bandwidth is 40 MHz, each of the plurality of wireless resources corresponds to at least one STU among 19 STUs, and
   wherein each of the plurality of wireless resources comprises only the at least one second resource unit and the size of the bandwidth is 80 MHz, each of the plurality of wireless resources corresponds to at least one STU among 38 STUs.

4. The method of claim 1, wherein the first resource unit corresponds to a BTU (basic tone unit) of a 56 tone size,
   wherein the second resource unit corresponds to a STU (small tone unit) of a 26 tones size,
   wherein a size of the virtual allocation resource unit is one of 242 tones corresponding to a combination of 2 of the BTUs and 5 of the STUs, 246 tones corresponding to a combination of 3 of the BTUs and 3 of the STUs, or 250 tones corresponding to a combination of 4 of the BTUs and 1 of the STUs.

5. The method of claim 1, wherein when a size of the bandwidth is a first bandwidth size, each of the plurality of wireless resources comprises the at least one first resource unit,
   wherein when a size of the bandwidth is a second bandwidth size, each of the plurality of wireless resources comprises only the at least one second resource unit,
   wherein the first bandwidth size is greater than the second bandwidth size.

6. An access point (AP) for allocating a wireless resource based on a single resource unit in a wireless local area network (WLAN), the AP comprising:
   a RF (radio frequency) unit which transmits and receives a wireless signal; and
   a processor which is coupled operatively with the RF unit,
   wherein the processor schedules each of a plurality of wireless resources for communication with a plurality of STAs (stations) on a bandwidth,
   wherein the process is implemented to transmit each of a plurality of downlink data to each of the plurality of STAs through each of the plurality of wireless resources,
   wherein when resource allocation based on a virtual allocation resource unit is not supported, each of the plurality of wireless resources comprises only at least one first resource or only at least one second resource,
   wherein a size of the first resource unit is greater than a size of the second resource unit,
   wherein the virtual allocation resource unit is a combination of the at least one first resource unit and the at least one second resource unit including a plurality of data tones which can be interleaved by one interleaver.

7. The AP of claim 6, wherein the first resource unit is a basic tone unit (BTU) corresponding to 56 tones,
   wherein each of the plurality of wireless resources comprises only the at least one first resource unit and a size of the bandwidth is 20 MHz, each of the plurality of wireless resources corresponds to at least one BTU among 4 BTUs, wherein each of the plurality of wireless resources comprises only the at least one first resource unit and when the size of the bandwidth is 40 MHz, each of the plurality of wireless resources corresponds to at least one BTU among 8 BTUs, and wherein when each of the plurality of wireless resources comprises only the at least one first resource unit and when the size of the bandwidth is 80 MHz, each of the plurality of wireless resources corresponds to at least one BTU among 17 or 18 BTUs.

8. The AP of claim 7, wherein the second resource unit is a STU (small tone unit) corresponding to 26 tones, wherein each of the plurality of wireless resources comprises only the at least one second resource unit and the size of the bandwidth is 20 MHz, each of the plurality of wireless resources corresponds to at least one STU among 9 STUs, wherein each of the plurality of wireless resources comprises only the at least one second resource unit and the size of the bandwidth is 40 MHz, each of the plurality of wireless resources corresponds to at least one STU among 19 STUs, and wherein each of the plurality of wireless resources comprises only the at least one second resource unit and the size of the bandwidth is 80 MHz, each of the plurality of wireless resources corresponds to at least one STU among 38 STUs.

9. The AP of claim 6, wherein the first resource unit corresponds to a BTU (basic tone unit) of a 56 tone size, wherein the second resource unit corresponds to a STU (small tone unit) of a 26 tones size, wherein a size of the virtual allocation resource unit is one of 242 tones corresponding to a combination of 2 of the BTUs and 5 of the STUs, 246 tones corresponding to a combination of 3 of the BTUs and 3 of the STUs, or 250 tones corresponding to a combination of 4 of the BTUs and 1 of the STUs.

10. The AP of claim 6, wherein when a size of the bandwidth is a first bandwidth size, each of the plurality of wireless resources comprises the at least one first resource unit, wherein when a size of the bandwidth is a second bandwidth size, each of the plurality of wireless resources comprises only the at least one second resource unit, wherein the first bandwidth size is greater than the second bandwidth size.

* * * * *